United States Patent [19]

Yoshida et al.

[11] 4,115,074
[45] Sep. 19, 1978

[54] GASIFICATION PROCESS

[75] Inventors: Kenji Yoshida, Fujisawa; Kazuyoshi Isogaya; Tadayoshi Tomita, both of Yokohama; Katsutoshi Kikuchi, Fujisawa; Hisaharu Kuboyama, Yokohama, all of Japan

[73] Assignees: Mitsui Toatsu Chemicals, Inc.; Toyo Engineering Corporation, both of Tokyo, Japan

[21] Appl. No.: 751,168

[22] Filed: Dec. 16, 1976

[30] Foreign Application Priority Data

Dec. 26, 1975 [JP] Japan .................. 50-155111

[51] Int. Cl.² .............................................. C10J 1/06
[52] U.S. Cl. ........................................ 48/95; 48/107;
48/212; 48/215; 423/650
[58] Field of Search ............ 48/75, 76, 63, 102 R, 48/105, 107, 95, 214 A, 215, 197 R, 211, 212; 423/650; 23/288 R

[56] References Cited

U.S. PATENT DOCUMENTS

| 951,512 | 3/1910 | Percy | 48/75 |
|---|---|---|---|
| 1,970,996 | 8/1934 | Ditto | 48/215 |
| 2,904,417 | 9/1959 | Nuyl | 48/107 |
| 3,048,476 | 8/1962 | Dwyer | 48/215 |
| 3,743,606 | 7/1973 | Marion et al. | 48/95 |

Primary Examiner—S. Leon Bashore
Assistant Examiner—George C. Yeung
Attorney, Agent, or Firm—Blanchard, Flynn, Thiel, Boutell & Tanis

[57] ABSTRACT

A gasification process for forming a gas mixture containing hydrogen wherein a hydrocarbon including a heavy residual oil is atomized with a mixture of an oxygen-containing gas and steam in an atomizing zone, the formed jet streams containing the atomized hydrocarbon drops are introduced to the catalyst bed while adjusting the residence time in the atomizing zone to 0.05 to 5 seconds, substantially without forming eddy currents and the reaction is carried out at a temperature of at least 850° C. to form said gas mixture while avoiding deposition of solid carbon on said catalyst bed.

8 Claims, 3 Drawing Figures

FIG. 1
FIG. 2
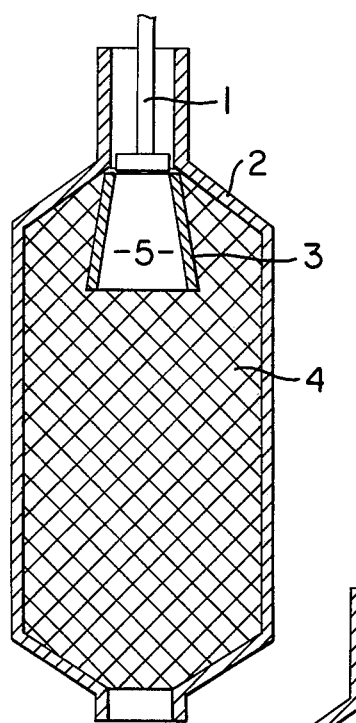
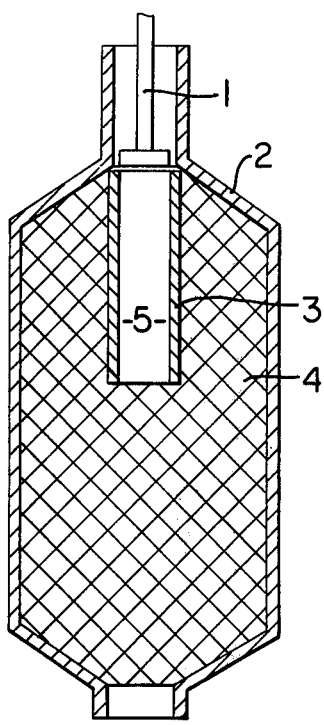
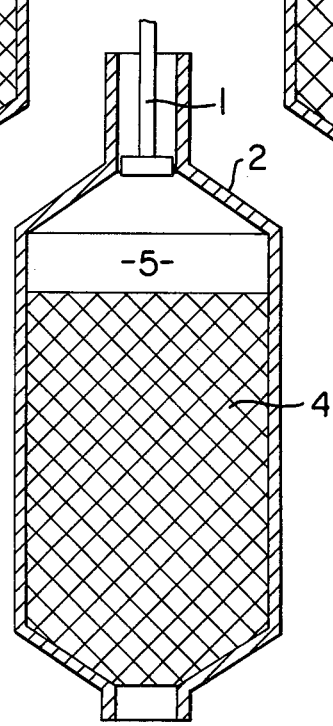
FIG. 3

GASIFICATION PROCESS

BACKGROUND OF THE INVENTION

1. Field of the Invention

The present invention relates to a process for forming hydrogen-containing gas mixtures by catalytic partial oxidation of hydrocarbon mixtures containing a heavy residual oil.

2. Description of Prior Arts

As the process for the gasification of natural gases and light hydrocarbons such as petroleum fractions of up to naphtha, there are known a partial oxidation process using a nickel catalyst, a steam reforming process and a non-catalytic partial oxidation process. For the gasification of hydrocarbon mixtures containing a heavy residual oil, such as crude oils, atmospheric pressure distillation residual oils and vacuum distillation residual oils, only the partial oxidation process not using a catalyst is worked on an industrial scale, and the catalytic steam reforming process or the catalytic partial oxidation process has not yet been industrialized.

The process for the gasification of a hydrocarbon mixture containing a heavy residual oil by non-catalytic partial oxidation has already been utilized for production of synthesis gases such as ammonia and methanol synthesis gases. With recent tightening of regulations for the maximum permissible $SO_2$ concentration in exhausted gases for prevention of environmental pollution, application of this partial oxidation process to desulfurization gasification for obtaining clean fuel gases by removing from the formed gas mixture sulfur which is converted to hydrogen sulfide at the gasification has been tried in the art.

This non-catalytic partial oxidation process comprises adding steam to a heavy residual oil and partially burning the heavy oil at a temperature higher than about 1,300° C. by oxygen, oxygen-rich air or air to thereby gasify the heavy residual oil. Since a high temperature is required in that process, oxygen must be used in a large quantity when oxygen is used. Therefore, that process is defective in that an expensive oxygen supply apparatus having a large capacity must be provided. When air is used, a large quantity of compression power must be supplied to the air compressor.

Heat is recovered from a high temperature gas formed by the gasification by generating steam by heat exchange, but since carbon is present in the gas and the gas pressure is high, the expenses of equipment for performing this heat exchange become tremendous.

Further, in order to obtain a high temperature, a larger proportion of the starting oil must be burnt. Therefore, the yield of the formed gas is reduced although the quantity of steam obtained by heat recovery increases.

In the fuel gas or the synthesis gas production processes in which it is a primary object to obtain the formed gas, reduction of the yield of the formed gas results in reduction of the productivity of the process. Even if all of steam, electric power and fuel gas are intended products, when the yield of the fuel gas is low, the range of controlling the production ratio of steam, electric power and fuel gas is narrowed and the flexibility of the process becomes small.

If the yield of the fuel gas is high, it is possible to generate electric power by using the steam formed by employing the fuel gas for a boiler. In other words, the ratio of the outputs of steam, electric power and fuel gas can be selected optionally to some extent.

Furthermore, since the reaction temperature is high in the above-mentioned non-catalytic partial oxidation process, the spray nozzle for feeding the starting oil to the reactor is extremely damaged, and replacement of nozzles must be performed frequently, resulting in a reduction of the operation efficiency. Moreover, because of the high reaction temperature, the refractory bricks constituting the inner wall of the reactor are damaged by heavy metals contained in the heavy residual oil.

Still in addition, in the above non-catalytic partial oxidation process, formation of carbon in an amount of 2 to 4% cannot be obviated, and therefore, equipment expenses must be additionally increased for removal of the formed carbon and recycle of it to the feed stock and the operation efficiency is lowered accordingly.

In order to overcome the foregoing defects involved in the conventional process, it is desired to perform gasification at lower temperatures by the catalytic partial oxidation and to reduce formation of carbon.

It is known that catalysts comprising as a main active component an alkali metal such as Na and K or an alkaline earth metal such as Be, Mg, Ca and Sr are effective for such catalytic gasification.

As the process using a catalyst of this type, there are ordinarily considered a process using a fluidized bed reactor and a process using a fixed bed reactor. When a fixed catalyst bed reactor is used for gasification of a hydrocarbon mixture containing a heavy residual oil, the catalyst bed is clogged in a short time by carbon formed by the reaction and continuation of the operation becomes impossible. Therefore, efforts have heretofore been mainly made to develop a process using a fluidized bed reactor.

The fluidized bed is not adversely affected directly by formation of carbon, but the process using a fluidized bed is defective in that complex techniques must be developed for prevention of wearing of catalyst particles, facilitation of supply and withdrawal of the catalyst, increase of the operation scale and elevation of the operation pressure.

If the defect of clogging by deposited carbon is eliminated, the process using a reactor of the fixed bed type will apparently be advantageous because the structure of the reactor is simple and the operation efficiency is high.

SUMMARY OF THE INVENTION

An object of this invention is to continuously gasify a liquid hydrocarbon containing a heavy residual oil by performing catalytic partial oxidation at low temperatures by contacting it with the fixed catalyst bed substantially without deposition of carbon in the catalyst bed.

According to this invention there is provided a gasification process for forming a gas mixture containing hydrogen by atomizing a liquid hydrocarbon including a heavy residual oil with a mixture of an oxygen-containing gas and steam in an atomizing zone and contacting the mixture containing the atomized hydrocarbon drops with a fixed catalyst bed, characterized by introducing the formed jet streams of the hydrocarbon, oxygen-containing gas and steam to the catalyst bed while adjusting the residence time in the atomizing zone to 0.05 to 5 seconds substantially without forming eddy currents and carrying out the reaction at a temperature of at least 850° C. to form said gas mixture. It is suitable that the hydrocarbons including heavy residual oils used in this invention have a specific gravity of from 0.8 to 1.3 and a ratio of hydrogen atom to carbon atom in the range between 0.8 and 2.4, especially 1.2 and 1.8. As the heavy residual oil, there may be used crude oil, atmospheric pressure distillation residual oils, vacuum distillation residual oils, propanedeasphalted oils and mixtures of the above mentioned residual oils and hydrocarbons such as light fractions of petroleum.

Heavy residual oils are different from light petroleum fractions in the point that they are not completely vaporized by heating but decomposition and coking take place. Accordingly, when a hydrocarbon mixture containing a heavy residual oil is partially oxidized, it is very important to atomize the starting hydrocarbon mixture with a gasifying agent, i.e., an oxygen containing gas and steam and mix the fine atomized drops uniformly with said gasifying agent.

If atomization is insufficient or uniform mixing with the gasifying agent is not attained, carbon is formed beyond the gasifying ability of the catalyst, resulting in clogging of the catalyst bed.

An atomizing zone having a size exceeding a certain limit is necessary for attaining this atomization. It is construed that this necessary size of the atomizing zone will correspond to a residence time of about 0.001 second. Accordingly, it is deemed that it is necessary that the atomizing zone should have a size sufficient to provide a residence time of at least 0.001 second. However, it has been found that if the atomized hydrocarbon is immediately contacted with the catalyst bed, the surface of the catalyst is blackened with carbon and deposition of carbon is caused. The reason has not been completely elucidated, but it is construed that the mixing with the gasifying agent is insufficient or that the temperature of fine oil drops just after atomization is low and the catalyst with which such oil drops are contacted is not allowed to exert a sufficient gasifying ability at such low temperature. It is deemed that it is preferred that the fine oil drops shall be heated to suitable temperatures by radiant heat of the catalyst bed or flame or by convection of heat by the formed gas and then be introduced to the catalyst bed with partial decomposition and combustion. The starting hydrocarbon is preferably introduced in the form of a jet stream of a uniform mixture of the finely atomized hydrocarbon drops and the gasifying agent for prevention of formation of carbon. From the results of experiments made by us, it has been found that at a reaction temperature higher than 850° C., a residence time of at least 0.05 second is necessary, although this residence time is varied to some extent depending on the kind of the starting hydrocarbon oil or the temperature of the gasifying agent.

If the heated fine oil drops reside in the atomizing zone for too long a time, the temperature is further elevated and after completion of the reaction with oxygen in the gasifying agent, many complicated reactions occur simultaneously, resulting in the formation of carbon. Therefore, it is necessary to introduce the finely atomized oil drops to the catalyst bed in a certain period of time. As a result of experiments, it has been found that it is preferred that when the reaction is carried out at a temperature not lower than 850° C., the atomized oil drops are introduced to the catalyst layer within a residence time of 5 seconds. Even if the residence time exceeds 5 seconds, formation of carbon is not abruptly caused although slight formation of carbon is observed. However, in view of the reduction of construction expenses of the reactor, a shorter residence time is preferred, and a residence time longer than 5 seconds results in an economical disadvantage.

In the present invention, it is necessary that substantial eddy currents are not caused in the atomizing zone. This has been found based on experimental results. The reason is considered to be that in the space of the atomizing zone where eddy currents are present, the finely atomized drops reside for too long a time in such space because of the eddy currents, and such undesirable phenomena as the occurrence of complicated reactions, deposition of carbon and insufficient mixing with the gasifying agent in the vicinity of the eddy currents are brought about.

In order to prevent formation of eddy currents, according to embodiments of this invention, the atomizing zone has a cylindrical or frustoconical shape, as shown in FIG. 1 and FIG. 2, wherein the inside diameter at the top end is twice as large as the diameter of the nozzle and an angle substantially smaller than the atomization angle of the jet streams which are composed of starting hydrocarbon oils and a gasifying agent and atomized from the nozzle. Such atomization angle depends on the structure of the nozzle. It furthermore is such that all of the inside of the atomizing zone can be substantially seen from the center of the nozzle. Provided that the above mentioned requirements are satisfied, the periphery of the atomizing zone may be a little curved or zigzag. A reaction vessel whose inner wall is composed of a heatresistant alloy or ceramic material such as alumina, which has a cylindrical or frustoconical shape, may be used as such atomizing zone. Alternately, a structure having such shape may be placed in the catalyst bed to form the atomizing zone, as shown in FIGS. 1 and 2. In the latter case, the space-forming structure may be a porous or cage-like structure having holes having a size not permitting the entry of the catalyst into the atomizing zone.

A suitable gap may be provided between the nozzle and the atomizing zone-forming means, otherwise holes or slits may be provided in the upper portion of said means, so that a product gas mixture can be circulated therethrough from the catalyst bed by the aspiration caused by the atomization from the nozzle. In this case, the holes and slits are preferably located so that circulated gases may be introduced very close to the nozzle.

The starting hydrocarbon oils and a gasifying agent are mixed so that the steam ratio of moles of $H_2O$ to atoms of carbon may be from 0.3 or more, preferably from 0.3 to 2.5. The ratio of moles of oxygen to atoms of carbon depends on the kind of starting hydrocarbon oil used, the steam ratio, the temperature to which the starting hydrocarbon oil and the gasifying agent are pre-heated and the reaction temperature, and is generally from 0.25 to 0.7. As to the reaction temperature, the temperature of the gas of the outlet from the catalyst bed is 850° C. or higher, preferably 850° to 1200° C., most preferably 950° to 1100° C. The reaction pressure is preferred to be from atmospheric pressure to 150 kg/cm$^2$ (gauge), especially 30 to 100 kg/cm$^2$ (gauge). The starting hydrocarbon oils are preferred to have a temperature of from normal temperature to 400° C., especially from 100° to 350° C. The gas containing oxygen and steam are preferred to have temperatures of 200° to 1000° C., especially as to the former 200° to 800° C. and as to the latter 400° to 800° C. As the oxygen-containing gas, there may be used air, oxygen gas and a mixture thereof having a desired proportion. It is preferred that the jet stream of the gasifying agent containing finely atomized oil drops has, at the nozzle outlet, a velocity ranging from 100 m/sec. to sonic velocity, and has an atomization angle of less than 90°, especially less than 45°.

As a catalyst to be used in this invention, there may be used one or more elements selected from the group consisting of an alkali metal such as Na and K and an alkaline earth metal such as Be, Mg, Ca and Sr as an active components.

This invention provides advantages such that hydrocarbon oils including heavy residual oils can be gasified by the catalytic partial oxidation substantially without formation of carbon in the catalyst bed.

BRIEF DESCRIPTION OF DRAWINGS

FIGS. 1 to 3 illustrate schematic cross sections of reactors A, B and C used in the Example, respectively.

EXAMPLE

Calcium aluminate or potassium aluminate was packed as a catalyst into an alumina reactor having an inner diameter of 200 mm and a length of 1,500 mm, and an atomizing zone as shown in FIG. 1, 2 or 3 was formed in the vicinity of the top end of the atomizing nozzle. Thus, 13 runs of gasification indicated in Table 1 were conducted. After 48 hours' continuous operation, the reactor was disassembled and the presence or absence of carbon deposited on the surface and interior of the catalyst layer was examined.

Reactors A, B and C used in these runs are shown in FIGS. 1 to 3. More specifically, FIG. 1 illustrates the cross-section of the reactor A. A nozzle 1 with the atomization angle of 25° is disposed to atomize the starting oil with air or oxygen and steam. The reactor wall 2 is ordinarily protected by refractory bricks of alumina or the like. A frustoconical refractory material structure 3 composed of alumina or other ceramic material is disposed to form an atomizing zone. The inner diameter of the upper portion is 45 mm and the inner diameter of the lower portion is 75 mm. The gasifying catalyst 4 has a cylindrical shape 10 mm in the diameter and 10 mm in the length. Reference numeral 5 represents the atomizing zone.

FIG. 2 illustrates the cross-section of the reactor B, which is the same as the reactor A shown in FIG. 1 except that an atomizing zone 3 has a cylindrical shape 45 mm in inner diameter.

FIG. 3 illustrates the cross-section of the reactor C, in which an atomizing zone 5 is formed by the reactor wall per se and no contrivance is provided to prevent formation of eddy currents.

The catalysts used in these runs were prepared in the following manner:

Catalyst A (Calcium Aluminate)

Alumina cement (80% of $Al_2O_3$ and 19.5% CaO) was mixed with calcium hydroxide, and the mixture was molded and calcined at 1,300° C. for 24 hours.

Catalyst B (Potassium Aluminate)

Potassium carbonate was mixed with aluminum hydroxide in an amount of 6 moles per mole of potassium carbonate, and the mixture was molded, calcined at 1,500° C. for 1 hours and pulverized. Then, the resulting particles were mixed and kneaded with sawdust and a binder, molded into a cylinder having a diameter of 10 mm and a length of 10 mm and calcined at 1,500° C. for 6 hours.

In run No. 1, gasification was carried out so that the residence time in the atomizing zone of the frustoconical shape (the length being 45 mm) in the reactor shown in FIG. 1 was 0.02 second. When the reactor was disassembled, it was found that the surface of the catalyst layer was blackened and sooty carbon was present.

In runs Nos. 2, 3, 4 and 5, the length of the frustoconical space of the atomizing zone or the pressure was arranged so as to control the residence time in the range of from 0.05 to 3.0 seconds. In each run, deposition of carbon was not observed at all.

In run No. 6, the residence time in the frustoconical space of the atomizing zone was 5.5 seconds. When the reactor was disassembled, it was found that a slight amount of sooty carbon was scattered on the catalyst layer.

In run No. 7, the space of the reactor above the catalyst layer was used as the atomizing space. The residence time was about 2.5 seconds. Since the reactor had such a structure that swirling streams were readily formed in the atomizing space, carbon was deposited on the catalyst bed in a thickness of about several millimeters.

In run No. 8, the starting oil was atomized in a cylindrical space of the atomizing zone corresponding to a residence time of 1 second. As in case the above-mentioned frustoconical shape, deposition of carbon was not observed at all.

In run No. 9, oxygen was used instead of air. Similarly, deposition of carbon was not observed.

In run No. 10, the gasification temperature in run No. 3 was lowered by 100° C., namely, the gasification was carried out at 900° C. As in run No. 3, deposition of carbon was not observed at all.

In run No. 11, the catalyst used in run No. 4 was replaced by potassium aluminate. As in run No. 4, deposition of carbon was not observed at all.

In run No. 12, the pressure used in run No. 4 was elevated by 10 times. As in run No. 4, deposition of carbon was not observed.

In run No. 13, eight openings having 5 mm diameter were provided in the upper portion of a space-forming, frustoconical refractory material in the manner such that the upper end of the opening might be as high as the end of the nozzle, whereby product gases were circulated by the aspiration caused by the atomization from the nozzle. In this test, there could also be observed no deposition of carbon.

Reaction conditions in runs Nos. 1 to 13 and obtained results are summarized in Table 1.

Table 1

| Run No. | Catalyst | Starting Oil* (Kg/hr) | Steam (Kg/hr) | Air (Nm²/hr) | Reaction Temperature (° C) | Pressure (Kg/cm². G) | Shape of Atomizing Space | Residence Time in Atomizing Space (sec) | Deposition of Carbon |
|---|---|---|---|---|---|---|---|---|---|
| con- | | | | | | | | | sooty |

Table 1-continued

| | Run No. | Catalyst | Starting Oil* (Kg/hr) | Steam (Kg/hr) | Air (Nm²/hr) | Reaction Temperature (°C) | Pressure (Kg/cm². G) | Shape of Atomizing Space | Residence Time in Atomizing Space (sec) | Deposition of Carbon |
|---|---|---|---|---|---|---|---|---|---|---|
| trol | 1 | catalyst A | 1.0 | 2.4 | 3.6 | 1000 | 0.2 | reactor A | 0.02 | carbon |
| this | 2 | A | 1.0 | 2.4 | 3.6 | 1000 | 0.2 | A | 0.05 | not observed |
| in- | 3 | A | 1.0 | 2.4 | 3.6 | 1000 | 0.2 | A | 0.2 | " |
| ven- | 4 | A | 1.0 | 2.4 | 3.6 | 1000 | 3.0 | A | 1.0 | " |
| tion | 5 | A | 1.0 | 2.4 | 3.6 | 1000 | 4.0 | A | 3.0 | " |
| | 6 | A | 0.7 | 1.7 | 2.5 | 1000 | 4.0 | A | 5.5 | slightly scattering |
| con- trol | 7 | A | 1.0 | 2.4 | 3.6 | 1000 | 0.2 | reactor C | 1.0 | vigorous deposition |
| | 8 | A | 1.0 | 2.4 | 3.6 | 1000 | 3.0 | reactor B | 1.0 | not observed |
| this | 9 | A | 1.0 | 2.4 | 0.75 ($O_2$) | 1000 | 0.2 | reactor A | 0.2 | " |
| in- | 10 | A | 1.0 | 2.4 | 3.6 | 900 | 0.2 | A | 0.2 | " |
| ven- | 11 | catalyst B | 1.0 | 2.4 | 3.6 | 1000 | 3.0 | A | 1.0 | " |
| tion | 12 | catalyst A | 10.0 | 24 | 36 | 1000 | 30.0 | A | 1.0 | " |
| | 13 | A | 1.0 | 2.4 | 3.6 | 1000 | 0.2 | A** | 0.05 | " |

Notes/
*:residual oil formed at reduced pressure distillation of crude oil produced in Kuwait; Specific gravity (15/4° c) 1.033, C:83.97 wt.%, H:10.33 wt.%, S:5.21 wt.%, N:0.7 wt.%, Ni:30 ppm, V:100 ppm.
**:Eight openings having 5 mm diameter were provided in the upper portion of the space-forming, frustoconical refractory material so that the upper end of the openings might be as high as the end of the nozzle.

The embodiments of the invention in which an exclusive property or privilege is claimed are defined as follows:

1. In an apparatus for the catalytic partial oxidation of heavy residual oil-containing hydrocarbons to give a gas mixture, said apparatus comprising a reaction vessel containing an atomization nozzle and a fixed catalyst bed spaced from said atomization nozzle, the improvement which comprises: means defining a catalyst-free atomizing zone extending from said atomization nozzle and projecting into said fixed catalyst bed, said atomizing zone having a cylindrical or frustoconical shape; the inside diameter of the end of said atomizing zone adjacent said atomization nozzle having a diameter within twice as large as the diameter of said nozzle; the angle of the sidewall of said atomizing zone being smaller than the atomization angle of the streams from said nozzle; and all the inside wall of said atomizing zone being visible from the center of the nozzle.

2. In a gasification process for forming a gas mixture containing hydrogen by atomizing in nozzle means a hydrocarbon containing a heavy residual oil with a mixture of an oxygen-containing gas and steam, mixing same in an atomizing zone to form a uniform mixture containing atomized liquid hydrocarbon and contacting said mixture containing the atomized liquid hydrocarbon with a fixed catalyst bed, the improvement comprising:

directing one or more jet streams of atomized hydrocarbon, oxygen-containing gas and steam from said nozzle means into said atomizing zone at a velocity of from 100 m/sec to sonic velocity at the nozzle outlet, and after mixing same in said atomizing zone introducing said mixture to the catalyst bed while maintaining the residence time of said hydrocarbon in said atomizing zone in the range of from 0.05 to 5 seconds, substantially without forming eddy current, and carrying out the reaction at a temperature of from 850° C. to 1200° C. to form said gas mixture while avoiding deposition of solid carbon on said catalyst bed.

3. A process as claimed in claim 2, in which said catalyst contains at least a metal selected from the group consisting of alkali metals and alkaline earth metals.

4. A catalytic partial oxidation process for producing a gas mixture containing hydrogen from a liquid hydrocarbon containing a heavy residual oil, said process utilizing an atomizing nozzle, means defining a catalyst-free atomizing zone and a fixed catalyst bed composed of a catalyst effective to cause partial oxidation of said liquid hydrocarbon to form said gas mixture, said atomizing zone being disposed between said nozzle and said fixed catalyst bed with the end of said atomizing zone adjacent said nozzle being disposed to receive one or more jet streams from said nozzle and wherein the other end of said atomizing zone projects into said fixed catalyst bed, said process consisting essentially of the steps of: feeding to said nozzle said liquid hydrocarbon containing a heavy residual oil, oxygen or an oxygen-containing gas having a temperature of from 200° to 1000° C. and steam having a temperature of 200° to 1000° C. wherein the steam/carbon mole ratio is from 0.3 to 2.5 and the oxygen/carbon ratio is from 0.25 to 0.7, atomizing said liquid hydrocarbon in said oxygen or oxygen-containing gas and steam to form one or more jet streams of fine drops of liquid hydrocarbon mixed in said oxygen or oxygen-containing gas and steam, directing said jet stream or streams into said atomizing zone at a velocity of from 100 m/sec to sonic velocity and flowing said jet stream or streams through said atomizing zone which has a length such that residence time of the liquid hydrocarbon in said atomizing zone is from 0.05 to 5 seconds and so that the jet stream or streams in said atomizing zone are substantially free of eddy currents whereby fine drops of liquid hydrocarbon are uniformly mixed in said oxygen or oxygen-containing gas and steam and the liquid hydrocarbon drops become heated in said atomizing zone and directing the uniform mixture of fine drops of liquid hydrocarbon, oxygen or oxygen-containing gas and steam into and through said fixed catalyst bed at a temperature of from 850° to 1200° C., at a pressure from atmospheric pressure to 150 Kg/cm² gauge, and effective to cause said liquid hydrocarbon to undergo partial oxidation to form said gas mixture while avoiding deposition of solid carbon on said catalyst bed.

5. A catalytic partial oxidation process for synthesizing a gas mixture containing hydrogen from a liquid hydrocarbon containing a heavy residual oil, said process utilizing an atomizing nozzle, means defining a catalyst-free frusto-conical or cylindrical elongated atomizing zone and a fixed catalyst bed composed of a catalyst effective to cause partial oxidation of said liquid hydrocarbon to form said gas mixture, said atomizing zone being disposed between said nozzle and said fixed catalyst bed with the end of said atomizing zone adjacent said nozzle being disposed to receive one or more jet streams from said nozzle and having an internal diameter not larger than twice as large as the diameter of said nozzle and wherein the angle of inclination of the side wall of said atomizing zone is smaller than the atomization angle of said nozzle, and wherein the other end of said atomizing zone projects into said fixed catalyst bed, said process consisting essentially of the steps of: feeding to said nozzle said liquid hydrocarbon containing a heavy residual oil and having a temperature up to 400° C., oxygen or an oxygen-containing gas having a temperature of from 200° to 1000° C. and steam having a temperature of 200° to 1000° C. wherein the steam/carbon mole ratio is from 0.3 to 2.5 and the oxygen/carbon ratio is from 0.25 to 0.7, atomizing said liquid hydrocarbon in said oxygen or oxygen-containing gas and steam to form one or more jet streams of fine drops of liquid hydrocarbon mixed in said oxygen or oxygen-containing gas and steam, directing said jet stream or streams into said atomizing zone at a velocity of from 100 m/sec to sonic velocity and at an atomization angle of less than 90° and flowing said jet stream or streams through said atomizing zone which has a length such that the residence time of the liquid hydrocarbon in said atomizing zone is from 0.05 to 5 seconds and so that the jet stream or streams in said atomizing zone are substantially free of eddy currents whereby fine drops of liquid hydrocarbon are uniformly mixed in said oxygen or oxygen-containing gas and steam and the liquid hydrocarbon drops become heated in said atomizing zone and do not form carbon either in the atomizing zone or upon contact with said fixed catalyst bed; and then directing the uniform mixture of fine drops of liquid hydrocarbon, oxygen or oxygen-containing gas and steam into and through said fixed catalyst bed at a temperature of from 850° to 1200° C., at a pressure from atmospheric pressure to 150 $Kg/cm^2$ gauge, and effective to cause said liquid hydrocarbon to undergo partial oxidation to form said gas mixture while avoiding deposition of solid carbon on said catalyst bed.

6. A process as claimed in claim 5, in which the liquid hydrocarbon has a temperature of from 100° to 350° C., the oxygen or oxygen-containing gas has a temperature of 200° to 800° C., the steam has a temperature of 400° to 800° C., the atomization angle of said nozzle is less than 45°, the reaction temperature is from 950° to 1100° C. and the reaction pressure is from 30 to 100 $Kg/cm^2$ gauge.

7. A process as claimed in claim 6 in which said liquid hydrocarbon is selected from the group consisting of crude oil, atmospheric pressure distillation residual oils, vacuum distillation residual oils, propane-deasphalted oil and mixtures thereof with light fractions of petroleum.

8. A process as claimed in claim 7 in which said catalyst contains as catalytically active ingredient at least one element selected from the group consisting of Na, K, Be, Mg, Ca and Sr.

* * * * *